(12) United States Patent
Kurasawa

(10) Patent No.: US 7,483,098 B2
(45) Date of Patent: Jan. 27, 2009

(54) LIQUID CRYSTAL DISPLAY DEVICE AND ELECTRONIC APPARATUS

(75) Inventor: Hayato Kurasawa, Nagano (JP)

(73) Assignee: Seiko Epson Corporation (JP)

( * ) Notice: Subject to any disclaimer, the term of this patent is extended or adjusted under 35 U.S.C. 154(b) by 418 days.

(21) Appl. No.: 11/210,021

(22) Filed: Aug. 23, 2005

(65) Prior Publication Data

US 2006/0044497 A1    Mar. 2, 2006

(30) Foreign Application Priority Data

Sep. 2, 2004    (JP) ............................. 2004-255389

(51) Int. Cl.
*G02F 1/1335* (2006.01)

(52) U.S. Cl. ........................ 349/114; 349/43

(58) Field of Classification Search ................ 349/114, 349/138, 139, 178, 43
See application file for complete search history.

(56) References Cited

U.S. PATENT DOCUMENTS

| | | | |
|---|---|---|---|
| 6,330,047 B1 * | 12/2001 | Kubo et al. ................. | 349/147 |
| 6,922,219 B2 * | 7/2005 | Jin et al. ...................... | 349/113 |
| 7,088,408 B2 | 8/2006 | Ozawa et al. | |
| 7,271,866 B2 | 9/2007 | Ozawa et al. | |
| 2006/0203157 A1 | 9/2006 | Ozawa et al. | |

FOREIGN PATENT DOCUMENTS

| | | |
|---|---|---|
| JP | 11-242226 | 9/1999 |
| JP | 2000-305099 | 11/2000 |
| JP | 2003-222890 | 8/2003 |
| JP | 2003-295165 | 10/2003 |
| JP | 2003-295177 | 10/2003 |

OTHER PUBLICATIONS

Makoto Jisaki, et al., "Development of transflective LCD for high contrast and wide viewing angle by using homeotropic alignment", Asia Display / IDW '01, LCT8-3, pp. 133-136 (2001).

* cited by examiner

*Primary Examiner*—Thoi V Duong
(74) *Attorney, Agent, or Firm*—Harness, Dickey & Pierce, P.L.C.

(57) ABSTRACT

A liquid crystal display device includes liquid crystal having negative dielectric anisotropy, a liquid-crystal-layer-thickness adjusting layer provided between the liquid crystal layer and a substrate, an insulating film formed with a contact hole that brings an element electrode into electrical connection with an element forming layer. The contact hole is located within a dot region that includes reflective and transmissive display regions. The contact hole being disposed at a position outside of the reflective display region of the dot region.

8 Claims, 5 Drawing Sheets

LIQUID CRYSTAL DISPLAY DEVICE AND ELECTRONIC APPARATUS

RELATED APPLICATION

This application claims priority to Japanese Patent Application No. 2004-255389 filed Sep. 2, 2004 which is hereby expressly incorporated by reference herein in its entirety.

BACKGROUND OF THE INVENTION

1. Technical Field

The present invention relates to a liquid crystal display device and to an electronic apparatus.

2. Related Art

Transflective liquid crystal display devices in the related art have a problem in that a viewing angle is narrow in transmissive display. The reason is that, since a transflective sheet is provided on an inner surface of a liquid crystal cell to prevent the occurrence of parallax, reflective display is performed by using only one polarizing plate provided on an observer side, which results in a low degree of flexibility in the optical design. Therefore, in order to solve this problem, M. Jisaki et al. have proposed a liquid crystal display device using vertical-alignment-type liquid crystal, as disclosed in "Development of transflective LCD for high contrast and wide viewing angle by using homeotropic alignment," M. Jisaki et al., Asia Display/IDW'01, pp. 133 to 136 (2001). The liquid crystal display device has the following three features:

(1) A 'VA (vertical alignment) mode' is used in which liquid crystal molecules having negative dielectric anisotropy are vertically aligned with respect to substrates in an initial state, and are then inclined when a voltage is applied;

(2) A 'multi-gap structure' is used in which the thickness (cell gap) of a liquid crystal layer in a transmissive display region is different from that in a reflective display region (for example, see Japanese Unexamined Patent Application Publication No. 11-242226); and (3) An 'alignment dividing structure' is used in which each transmissive display region is formed in the shape of a regular octagon, and a projection is provided at the center of the transmissive display region on a CF substrate to make the liquid crystal molecules incline in all directions in the transmissive display region.

In the liquid crystal display device described in the above-mentioned related art, when alignment division is performed as described in the third feature, it is important to accurately control the liquid crystal molecules to be arranged in an intended alignment state. However, in an active matrix liquid crystal display device using thin film transistors (TFTs) or thin film diodes (TFDs) as switching elements, a strong electric field generated from these switching elements or signal lines connected thereto acts on a liquid crystal layer to cause alignment disorder of the liquid crystal. Therefore, in order to remove the effects of the strong electric field around the elements, an overlayer structure has been suggested in which an insulating film is formed to cover a layer including the switching elements and electrodes are formed on the insulating film.

The overlayer structure makes it possible to prevent the alignment disorder of the liquid crystal due to the strong electric field caused by the switching elements. However, in the overlayer structure, the electrodes are electrically connected to the switching elements through contact holes formed in the insulating film. As a result, concave portions corresponding to the contact holes are formed in a surface of a substrate coming into contact with the liquid crystal, and thus the thickness (cell gap) of the liquid crystal layer is larger than a design value in the concave portion. Thus, this structure has a problem in that display light appears to be colored.

SUMMARY

An advantage of the invention is that it provides an active matrix transflective liquid crystal display device having a multi-gap structure capable of effectively preventing alignment disorder of liquid crystal due to an electric field caused by switching elements and of achieving high-quality display without colored display light.

According to an aspect of the invention, a liquid crystal display device includes an element substrate; a counter substrate opposite to the element substrate; a liquid crystal layer that is interposed between the element substrate and the counter substrate, and that is composed of liquid crystal having negative dielectric anisotropy, the liquid crystal being vertically aligned in an initial state; dot regions each having a transmissive display region and a reflective display region; and a liquid-crystal-layer-thickness adjusting layer that is provided on a surface of at least one of the element substrate and the counter substrate facing the liquid crystal layer to make the thickness of the liquid crystal layer in the reflective display region relatively smaller than the thickness of the liquid crystal layer in the transmissive display region in the dot region. In this liquid crystal display device, an element forming layer including switching elements, an insulating film covering the element forming layer, and element electrodes formed on the insulating film are laminated in this order on a surface of the element substrate facing the liquid crystal. In addition, the element forming layer is electrically connected to the element electrodes through contact holes that are formed in the insulating film on the element substrate, and each contact hole is provided at an outer side of the reflective display region in the dot region.

In the liquid crystal display device having the overlayer structure in which the element forming layer is separated from the element substrates with the insulating film interposed therebetween, the contact holes for connecting the element forming layer to the element electrodes are formed at the outer side of the reflective display regions, respectively. Since concave portions corresponding to the contact holes are formed in the surface of the element substrate, the thickness of the liquid crystal layer becomes larger in the concave portions. When the contact hole is arranged in the reflective display region, display light passes through the liquid crystal layer in the concave portion two times, so that the display light appears to be colored, which results in low display quality. On the contrary, according to the invention, since the contact hole is arranged at the outer side of the reflective display region, it is possible to suppress the coloring of display light due to a variation in the thickness of the liquid crystal layer to a minimum. In addition, since the contact hole is arranged at the outer side of the reflective display region, light emitted from an illuminating device, such as a backlight, passes through the concave portion as display light. Therefore, it is possible to easily correct the coloring of the light emitted from the illuminating device, and thus to achieve high-quality display.

Further, in the invention, for example, in a color liquid crystal display device in which R (red), G (green), and B (blue) dots constitute one pixel, a display region, which is a minimum unit for performing display, is referred to as 'a dot region'. In addition, the 'reflective display region' provided in the dot region means a region capable of performing display using light incident on a display surface of the liquid crystal display device, and the 'transmissive display region' means a region capable of performing display using light incident on a rear surface (a surface opposite to the display surface) of the liquid crystal display device.

In the above-mentioned structure, it is preferable that the contact hole be provided so as to overlap, in plan view, an inclined region that is formed in the dot region by the liquid-crystal-layer-thickness adjusting layer.

The 'inclined region' is a region that is disposed at the boundary between the reflective display region and the transmissive display region, and corresponds to the boundary between regions where the thicknesses of the liquid crystal layer are different from each other due to the liquid-crystal-layer-thickness adjusting layer. According to the above-mentioned structure, since the contact hole is arranged in the inclined region where the thickness of the liquid crystal layer deviates from an optical design value, it is possible to effectively use the dot region to raise an aperture ratio, thereby obtaining high-brightness display. In addition, the contact hole arranged in the inclined region causes the thickness of the liquid crystal layer in the concave portion formed in the element substrate to be smaller than that in the region where the liquid-crystal-layer-thickness adjusting layer is not provided, which makes it possible to prevent the coloring of display light.

Further, in the above-mentioned structure, it is preferable that the contact hole be provided so as to be separated from a light-shielding member formed in the dot region in plan view. According to this structure, it is possible to use the region where the contact hole is formed for display, and thus to improve the brightness of display.

Furthermore, in the above-mentioned structure, it is preferable that the element forming layer be provided with wiring line portions each extending from the switching element to reach the contact hole, and that the wiring line portions be electrically connected to the element electrodes through the contact holes, respectively. According to this structure, it is possible to separate the switching element from the contact hole constituting an electrical connection portion to the element electrode in plan view. Therefore, it is possible to effectively prevent the effects of a strong electric field generated by the switching elements and signal lines connected thereto, and thus to achieve high-quality display.

In the above-mentioned structure, preferably, each element electrode includes a plurality of island-shaped portions two-dimensionally arranged in the dot region view and connecting portions for electrically connecting the island-shaped portions, and one or more island-shaped portions are provided in each of the reflective display region and the transmissive display region. In addition, it is preferable that the connecting portion be provided at a boundary between the two display regions. According to this structure, it is possible to align the liquid crystal molecules substantially in the radial direction in the plane regions corresponding to the respective island-shaped portions when a voltage is applied to the liquid crystal, which makes it possible to achieve a liquid crystal display device capable of performing display with a wide viewing angle and uniform contrast in all directions both in reflective display and in transmissive display. Further, since external light passes through the liquid crystal layer in the reflective display region two times for self-compensation, it is not necessary to make the liquid crystal molecules aligned substantially in the radial direction.

Moreover, in the above-mentioned structure, it is preferable that alignment control members for controlling the alignment of liquid crystal molecules be provided on the element electrodes each having a plurality of island-shaped portions and on counter electrodes opposite to the element electrodes with the liquid crystal layer interposed therebetween. In addition, preferably, the alignment control members are respectively arranged at the centers of the island-shaped portions in plan view. Further, dielectric projections formed on the counter electrodes or electrode openings each formed by cutting out a portion of the counter electrode can be used as the alignment control members.

According to this structure, it is possible to align the liquid crystal molecules in the radial direction in the island-shaped portions, which makes it possible to further improve the viewing angle characteristics of display, and to obtain high responsibility.

Further, in the above-mentioned structure, it is preferable that the island-shaped portion arranged in the transmissive display region be provided with a projecting portion that protrudes from one side thereof toward the outside, and that the contact hole be arranged so as to overlap the projecting portion in plan view. According to this structure, it is possible to make the liquid crystal molecules arranged in a good alignment state in the plane region of the island-shaped portion, and thus to improve the viewing angle characteristics of transmissive display.

Furthermore, in the above-mentioned structure, it is preferable that the projecting portion protrude from an outer edge of the element electrode toward the outside. According to this structure, since the contact hole is arranged in the vicinity of the outer edge of the dot region, it is possible to reduce the effects of the contact hole on display.

Moreover, in the above-mentioned structure, it is preferable that the projecting portion of the island-shaped portion arranged in the transmissive display region be formed to protrude toward another island-shaped portion connected to the island-shaped portion in the transmissive display region through the connecting portion. According to this structure, it is possible to effectively use the dot region to properly arrange the contact hole and the element substrate. Thus, the aperture ratio of pixel can be improved, which results in brighter display.

Further, in the above-mentioned structure, it is preferable that the projecting portion protrude from the island-shaped portion constituting the transmissive display region toward the island-shaped portion constituting the reflective display region so as to be arranged between the transmissive display region and the reflective display region. In the liquid crystal display device of the invention having the multi-gap structure, since a step portion formed by the liquid-crystal-layer-thickness adjusting layer exists in an area between the reflective display region and the transmissive display region, the thickness of the liquid crystal layer deviates from an optical design value in the area. Therefore, it is possible to arrange the contact hole in the area by providing the projecting portion in the area. As a result, it is possible to effectively use the plane region of the dot to properly arrange, for example, the element electrode, and thus to improve the aperture ratio.

According to another aspect of the invention, an electronic apparatus includes the above-mentioned liquid crystal display device of the invention. According to this structure, it is possible to provide an electronic apparatus including a transflective display unit capable of performing high-quality display with a wide viewing angle and high contrast.

BRIEF DESCRIPTION OF THE DRAWINGS

The invention will be described with reference to the accompanying drawings, wherein like numbers reference like elements, and wherein.

DESCRIPTION OF THE EMBODIMENTS

Hereinafter, preferred embodiments of the invention will be described with reference to the accompanying drawings. However, the technical scope of the invention is not limited to the following embodiments. In addition, in each drawing, the scale of each layer or member is adjusted in order to have a recognizable size.

First Embodiment

A first embodiment of the invention will now be described with reference to FIGS. 1 to 4.

A liquid crystal display device of this embodiment is an example of an active matrix liquid crystal display device using thin film diodes (hereinafter, referred to as 'TFDs') as switching elements, and is an example of a transflective liquid crystal display device capable of performing both reflective display and transmissive display.

Figure 1:
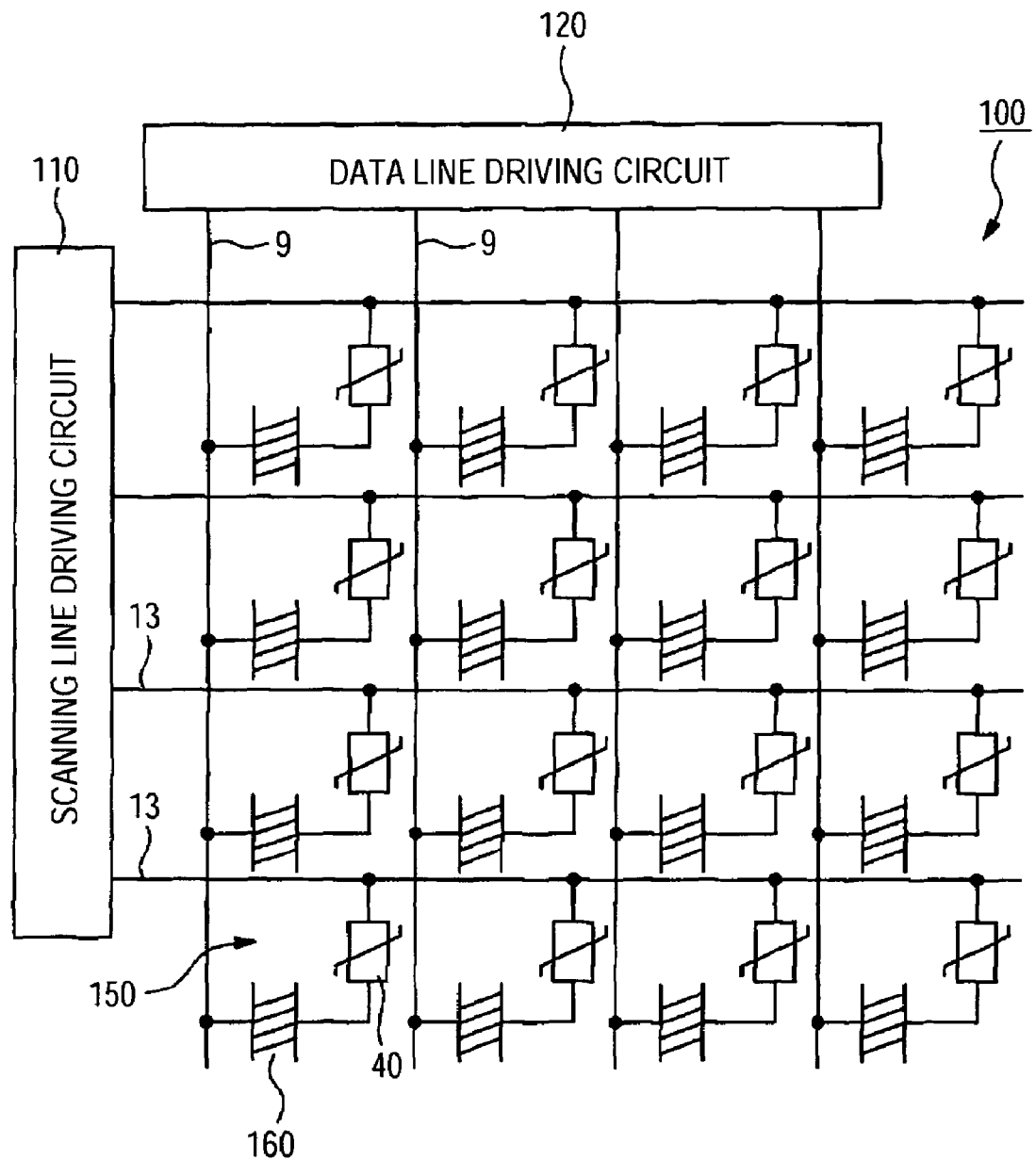
FIG. 1 is an equivalent circuit diagram of a liquid crystal display device according to a first embodiment of the invention.

FIG. 1 is an equivalent circuit diagram of a liquid crystal display device 100 according to this embodiment. The liquid crystal display device 100 includes a scanning line driving circuit 110 and a data line driving circuit 120. The liquid crystal display device 100 is provided with signal lines including a plurality of scanning lines 13 and a plurality of data lines 9 arranged perpendicular to the scanning lines 13. The scanning lines 13 are driven by the scanning line driving circuit 110, and the data lines 9 are driven by the data line driving circuit 120. In dot regions 150 provided corresponding to intersections of the scanning lines 13 and the data lines 9, respectively, a TFD element 40 and a liquid crystal display element 160 (liquid crystal layer) are connected to each other in series between the scanning line 13 and the data line 9. In addition, in FIG. 1, the TFD element 40 is connected to the scanning line 13, and the liquid crystal element 160 is connected to the data line 9. However, on the contrary, the TFD element 40 may be connected to the data line 9, and the liquid crystal element 160 may be connected to the scanning line 13.

Figure 2:
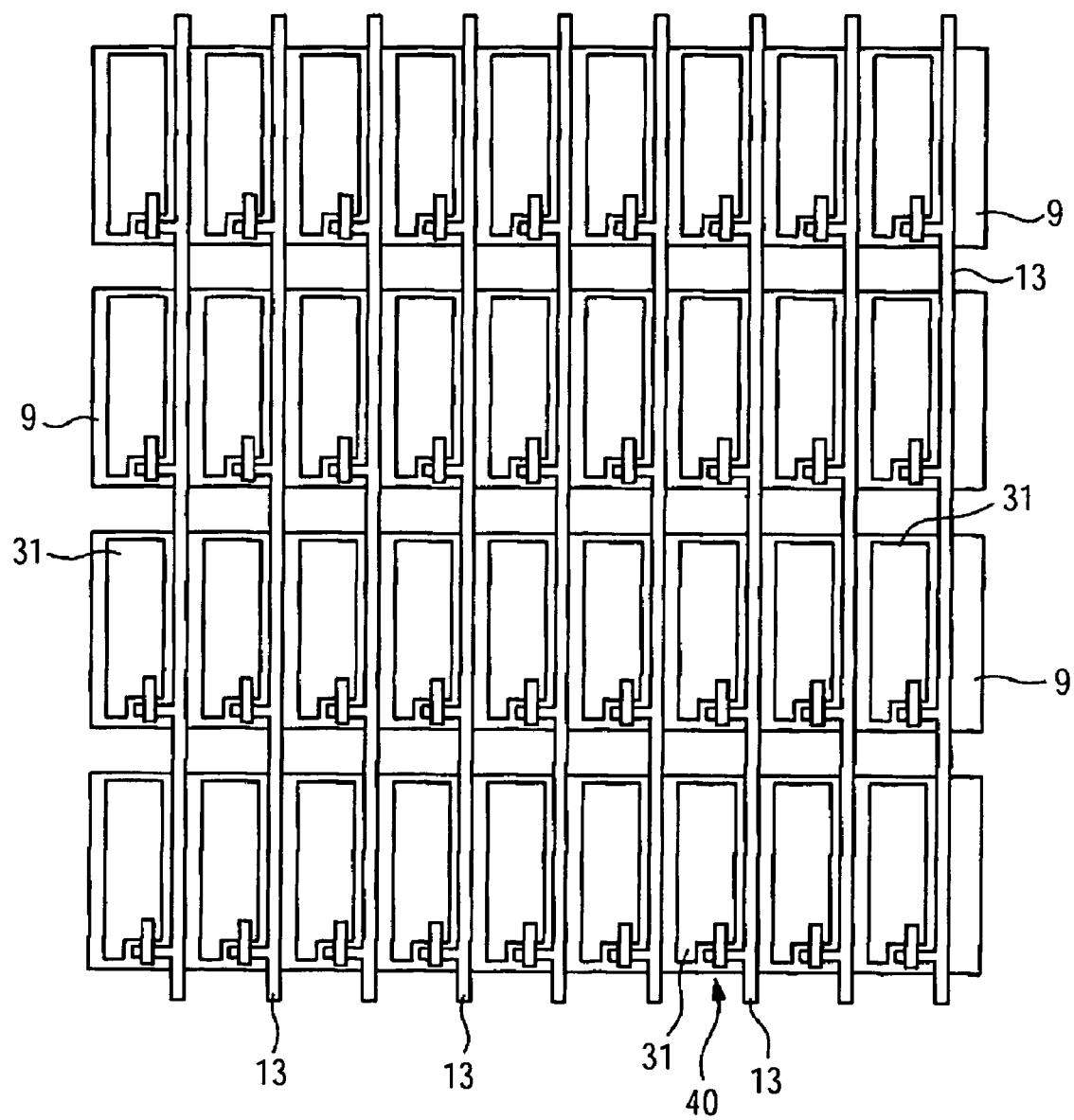
FIG. 2 is a plan view illustrating the structure of electrodes of the liquid crystal display device.

FIG. 2 is a plan view illustrating the electrode structure of the liquid crystal display device 100 of this embodiment. As shown in FIG. 2, in the liquid crystal display device 100, pixel electrodes 31 are respectively connected to the scanning lines 13 extending in the vertical direction of FIG. 2 through the TFD elements 40, and the pixel electrodes 31 are arranged in a matrix in plan view. In addition, strip-shaped counter electrodes 9 (second electrode) are provided so as to overlap a group of pixel electrodes 31 arranged in a horizontal direction (in the horizontal direction of FIG. 2) in plan view, and these counter electrodes 9 are aligned in a stripe arrangement in plan view.

The counter electrodes 9 correspond to the above-mentioned data lines, and extend in a direction perpendicular to the scanning lines 13. In this embodiment, each region provided with the pixel electrode 31 serves as one dot region, and the dot regions arranged in a matrix are provided with the TFD elements 40, respectively, which makes it possible to perform display control on every dot region.

In FIG. 2, each pixel electrode 31 is shown substantially in a rectangular shape for the convenience of explanation. However, in practice, each pixel electrode 31 has two island-shaped portions and a connecting portion for connecting them, as will be described later with reference to FIG. 3. Here, the TFD element 40 is a switching element for electrically connecting the scanning line 13 to the pixel electrode 31.

Figure 3:
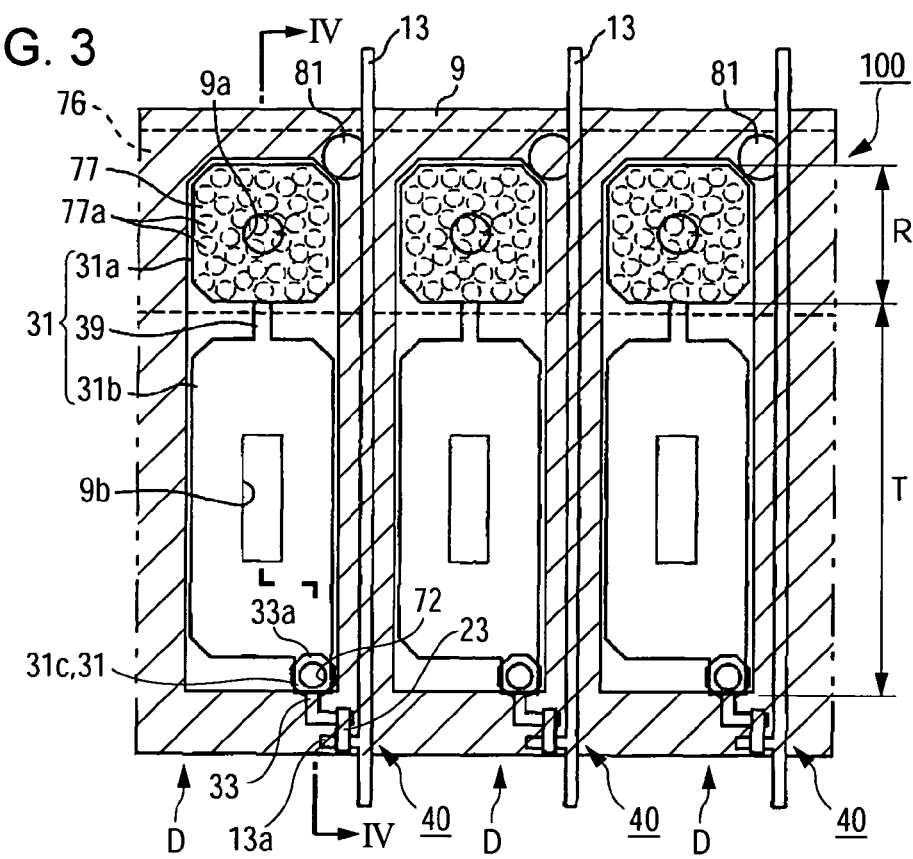
FIG. 3 is a plan view illustrating the structure of one pixel region of the liquid crystal display device.

Next, the pixel structure of the liquid crystal display device 100 according to this embodiment will be described with reference to FIGS. 3 and 4. FIG. 3 is a plan view illustrating a pixel region of the liquid crystal display device 100. The pixel region shown in FIG. 3 includes three dot regions D having substantially rectangular shapes in plan view that are arranged in a short-side direction. Although not shown in FIG. 3, for example, the dot regions D are provided with R (red), G (green), and B (blue) colored portions, respectively, so that color display is performed by a mixture of colored light components emitted from the respective dot regions.

One dot region D shown in FIG. 3 is provided with the scanning line 13 extending in the vertical direction of FIG. 3, the pixel electrode (element electrode) 31 arranged in the extending direction of the scanning line 13, and the TFD element 40 provided between the scanning line 13 and the pixel electrode 31. In addition, the counter electrodes 9 having strip shapes in plan view extend in the horizontal direction of FIG. 3 so as to be laid across the three dot regions.

Each pixel electrode 31 includes two island-shaped portions 31a and 31b that have substantially rectangular shapes in plan view and are arranged in the extending direction of the scanning lines 13 and a connecting portion 39 for connecting the island-shaped portions 31a and 31b. A reflective layer 77 is provided substantially at the same position as the island-shaped portion 31a having almost a square shape in plan view, and a plurality of uneven portions (light scattering members) 77a for scattering reflected light is provided on the surface of the reflective layer 77. The other island-shaped portion 31b having substantially a rectangular shape is formed to have a larger area than the island-shaped portion 31a in plan view, and has a projecting portion 31c that protrudes from a short side thereof located at the lower side of FIG. 3. That is, in the dot region D, a plane region of the island-shaped portion 31a corresponds to a reflective display region R, and a region where the other island-shaped portion 31b is provided corresponds to a transmissive display region T.

Further, an electrode slit 9a having a circular shape in plan view is provided at the center of the island-shaped portion 31a, and an electrode slit 9b having a rectangular shape in plan view is provided at the center of the island-shaped portion 31b. The electrode slits 9a and 9b are provided in the counter electrode 9 to control the alignment state of vertical-alignment-type liquid crystal when a voltage is applied. As such, since the pixel electrode 31 is divided into a plurality of island-shaped portions, radial liquid crystal domains can be respectively formed in the plane regions corresponding to the island-shaped portions when a voltage is applied, which makes it possible to achieve high-contrast display in all directions. In particular, in this embodiment, since the island-shaped portions 31a and 31b are provided corresponding to the reflective display region R and the transmissive display region T, respectively, it is possible to achieve display having high contrast and a wide viewing angle both in transmissive display and in reflective display.

The island-shaped portions 31*a* and 31*b* are formed substantially in rectangular shapes whose corners are chamfered, as shown in FIG. 3. However, the shapes thereof are not limited thereto, and the island-shaped portions 31*a* and 31*b* may be formed in, for example, circular shapes, elliptical shapes, and polygonal shapes other than the rectangular shape. That is, the island-shaped portions 31*a* and 31*b* may be formed by providing electrode slits formed by cutting out the pixel electrode in the edge of the dot region D.

The TFD element 40 includes a first electrode 23 having a rectangular shape in plan view that extends along the scanning line 13, a second electrode 13*a* that is branched from the scanning line 13 and intersects the first electrode 23, and a wiring line portion 33 that is formed between the first electrode 23 and the pixel electrode 31 so as to intersect the first electrode 23. In this structure, the first electrode 23 is composed of a metal film made of tantalum, which is the main ingredient, and an insulting film whose main ingredient is a tantalum oxide is formed thereon. In addition, the second electrode 13*a* (the scanning line 13) and the wiring line portion 33 are composed of metal films made of, for example, chrome, which is the main ingredient. In this embodiment, the TFD element 40 is composed of a so-called back-to-back TFD element in which thin film diodes having an MIM (metal-insulator-metal) structure are respectively formed at an intersection of the first electrode 23 and the second electrode 13*a* and an intersection of the first electrode 23 and the wiring line portion 33.

The wiring line portion 33 having an 'L' shape in plan view extends from the TFD element 40 to the pixel electrode 31, and a leading end thereof is connected to a contact portion 33*a* having substantially an octagonal shape in plan view. In addition, a contact hole 72 is provided so as to overlap the contact portion 33*a* in plan view, and the projecting portion 31*c* of the pixel electrode 31 is electrically connected to the contact portion 33*a* through the contact hole 72.

Figure 4:
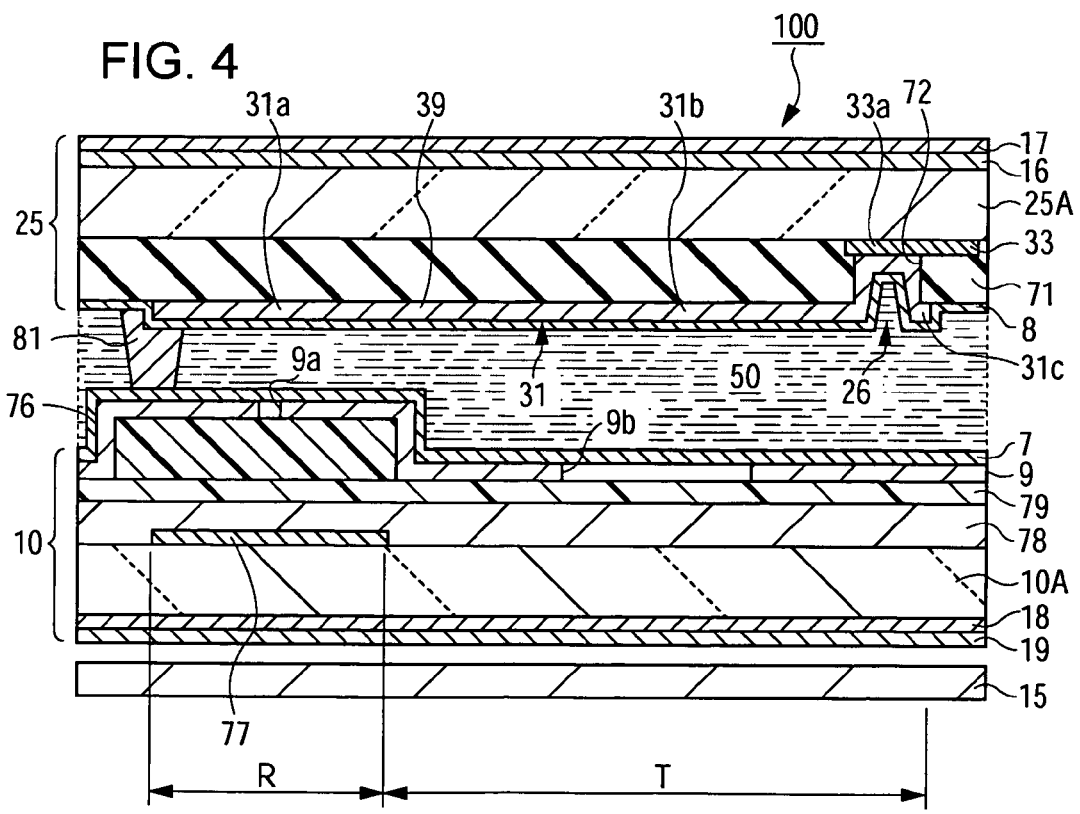
FIG. 4 is a cross-sectional view taken along the line IV-IV of FIG. 3.

FIG. 4 is a cross-sectional view taken along the line IV-IV of FIG. 3. As shown in FIG. 4, the liquid crystal display device 100 includes an element substrate 20 and a counter substrate 10 arranged opposite thereto, and a liquid crystal layer 50 composed of liquid crystal that has negative dielectric anisotropy and is vertically aligned in an initial state is interposed between the substrates 10 and 25. In addition, cylindrical spacers 81 are provided on surfaces of the substrates 10 and 25 opposite to each other to cause a gap between the substrates 10 and 25 to be kept uniform.

The element substrate 25 is formed by laminating the wiring line portions 33 and the contact portions 33*a*, an interlayer insulating film 71, and the pixel electrodes 31 in this order on an inner surface of a substrate body 25A made of a transmissive material, such as quartz or glass. An element forming layer having the wiring line portions 33, the TFD elements 40, and the scanning lines 13 formed thereon is provided between the interlayer insulating film 71 and the substrate body 25A. The pixel electrode 31 (the projecting portions 31*c*) on the interlayer insulating film 71 is electrically connected to the contact portion 33*a* (the wiring line portion 33) through the contact hole 72 that passes through the interlayer insulating film 71 made of, for example, a silicon oxide or a resin material to reach the contact portion 33*a*. In addition, a vertical alignment film 8 composed of, for example, a polyimide film is provided on the pixel electrodes 31 to cause the liquid crystal constituting the liquid crystal layer 50 to be vertically aligned in an initial state. An alignment process, such as a rubbing process, is not performed on the alignment film.

Meanwhile, the counter substrate 10 includes, as a base substrate, a substrate body 10A made of a transmissive material, such as quartz or glass. The reflective layer 77, a color filter 78 covering the reflective layer 77, a resin layer 79 for planarizing the surface of a colored portion (the color filter) 78, a liquid-crystal-layer-thickness adjusting layer 76 partially formed on the resin layer 79, and the counter electrodes 9 formed on the liquid-crystal-layer-thickness adjusting layer 76 and the resin layer 79 are provided on an inner surface (a surface facing the liquid crystal layer 50) of the substrate body 10A. In addition, a vertical alignment film 7 made of, for example, polyimide is formed so as to cover the counter electrodes 9.

The reflective layer 77 is composed of a metal film made of a reflective material, such as aluminum or silver, and is partially formed in the dot region, as shown in FIG. 3, so as to be arranged substantially at the same position as the island-shaped portion 31*a* of the element substrate 25 when seeing a panel in plan view.

The colored portion 78 is, for example, a color filter having one of three colors, and has a plane region corresponding to the plane region of the dot region D. In addition, in the color filters, a black matrix made of a light-shielding material (shown in hatching in FIG. 3) may be provided between the colored portions 78 that are two-dimensionally arranged corresponding to the dot regions. A resin film 79 made of a resin material, such as an acrylic resin, is provided to planarize the surface of the color filters.

As shown in FIGS. 3 and 4, the liquid-crystal-layer-thickness adjusting layer 76 made of, for example, an acrylic resin is partially formed in the plane region of the dot region D including the forming region of the reflective layer 77. Some of the counter electrodes 9 are formed on the liquid-crystal-layer-thickness adjusting layer 76, so that some regions protrude from a surface of the counter substrate 10 facing the liquid crystal layer, which causes the thicknesses of the liquid crystal layer 50 to be different from each other in the dot region. That is, the thickness (cell gap) of the liquid crystal layer in the region where the liquid-crystal-layer-thickness adjusting layer 76 is formed is smaller than that of the liquid crystal layer in the region where the liquid-crystal-layer-thickness adjusting layer 76 is not formed by the thickness of the liquid-crystal-layer-thickness adjusting layer 76. In this embodiment, since the reflective film 77 is provided in the region where liquid-crystal-layer-thickness adjusting layer 76 is formed, the liquid-crystal-layer-thickness adjusting layer 76 causes the thickness of the liquid crystal layer in the reflective display region R to be smaller than that of the other regions (including the transmissive display region T). For example, the thickness of the liquid crystal layer in the reflective display region R is 1.5 $\mu$m, and the thickness of the liquid crystal layer in the other regions is 3 $\mu$m.

Further, as shown in FIGS. 3 and 4, the counter electrode 9 includes the electrode slits 9*a* and 9*b*, and these electrode slits 9*a* and 9*b* are provided substantially at the centers of the island-shaped portions 31*a* and 31*b* arranged opposite thereto in plan view, respectively. This structure enables radial liquid crystal domains to be formed in the island-shaped portions 31*a* and 31*b*, respectively, when a voltage is applied.

A retardation plate 18 and a polarizing plate 19 are formed in this order on an outer surface (a surface opposite to the liquid crystal layer 50) of the substrate body 10A of the counter substrate 10. A retardation plate 16 and a polarizing plate 17 are formed in this order on an outer surface of the substrate body 25A of the element substrate 25. In addition, a backlight (illuminating unit) 15, serving as a light source for transmissive display, is provided on the outer side of the counter substrate 10.

Furthermore, as shown in FIGS. 3 and 4, the cylindrical spacer 81 for maintaining the gap between the substrates 10 and 25 to be uniform is provided in the region where the liquid-crystal-layer-thickness adjusting layer 76 is formed in the vicinity of the reflective display region R (the island-shaped portion 31a). That is, the cylindrical spacer 81 is provided in a portion of the dot region D where the thickness of the liquid crystal layer 50 is smaller than that in the other regions.

In the liquid crystal display device 100 of this embodiment having the above-mentioned structure, since the pixel electrode 31 of the element substrate 25 is separated from the element forming layer (the scanning lines 13, the TFD elements 40, etc.) with the interlayer insulating film 71 interposed therebetween, that is, an overlayer structure is adopted, it is possible to prevent the occurrence of alignment disorder of the liquid crystal molecules due to a strong electric field generated from the scanning lines 13 or the TFD elements 40, and thus to prevent the lowering of contrast.

Further, in this embodiment, since the contact hole 72 for electrically connecting the pixel electrode 31 to the contact portion 33a is provided at the outer side of the reflective layer 77, it is possible to prevent the coloring of display light at a position where the contact hole 72 is formed. A concave portion 26 is formed in the surface of the element substrate 25 due to the contact hole 72, which is a through hole, so that the concave portion 26 causes the thickness of the liquid crystal layer to be larger at the position where the contact hole 72 is formed. When the thickness of the liquid crystal layer is larger than an optical design value, yellowish white light is emitted. When the contact hole is provided in the reflective display region R where the thickness of the liquid crystal layer is smaller due to the liquid-crystal-layer-thickness adjusting layer 76, the ratio of the depth of the concave portion to the thickness of the liquid crystal layer is increased, and display light is greatly affected by the concave portion since the display light passes through the concave portion two times. On the contrary, according to this embodiment, when the contact hole is provided in the region where the thickness of the liquid crystal layer is relatively larger, it is possible to suppress the coloring of display light due to an increase in the thickness of the liquid crystal layer caused by the concave portion to a minimum. In addition, even though the coloring occurs, it is possible to easily correct the coloring of display light to some extent since color correction can be performed by using the backlight 15. Therefore, according to the liquid crystal display device 100 of this embodiment, it is possible to completely remove the effects of the contact hole 72 on display quality, and thus to achieve high-quality display.

Furthermore, in this embodiment, a portion of the pixel electrode 31 connected to the contact portion 33a through the contact hole 72 is composed of the projecting portion 31c protruding from the island-shaped portion 31b toward the outside. As such, since an electrical connection portion to the element forming layer is provided on the outer side of the island-shaped portion 31b, it is possible to properly align the liquid crystal molecules in the region of the island-shaped portion 31b, which makes it possible to achieve display with uniform contrast in all directions.

Second Embodiment

Next, a second embodiment of the invention will be described with reference to FIGS. 5 and 6. A liquid crystal display device of this embodiment is a transflective liquid crystal display device of a vertical alignment mode, similar to the liquid crystal display device 100 shown in FIGS. 1 to 4. In the liquid crystal display device of this embodiment, among the components shown in FIGS. 5 and 6, the same component as those of the liquid crystal display device 100 shown in FIGS. 1 to 4 have the same reference numerals, and a description thereof will be omitted. In addition, FIG. 5 corresponds to FIG. 3 in the first embodiment, and is a plan view illustrating one pixel region. FIG. 6 corresponds to FIG. 4 in the first embodiment, and is a cross-sectional view taken along the line VI-VI of FIG. 5.

Figure 5:
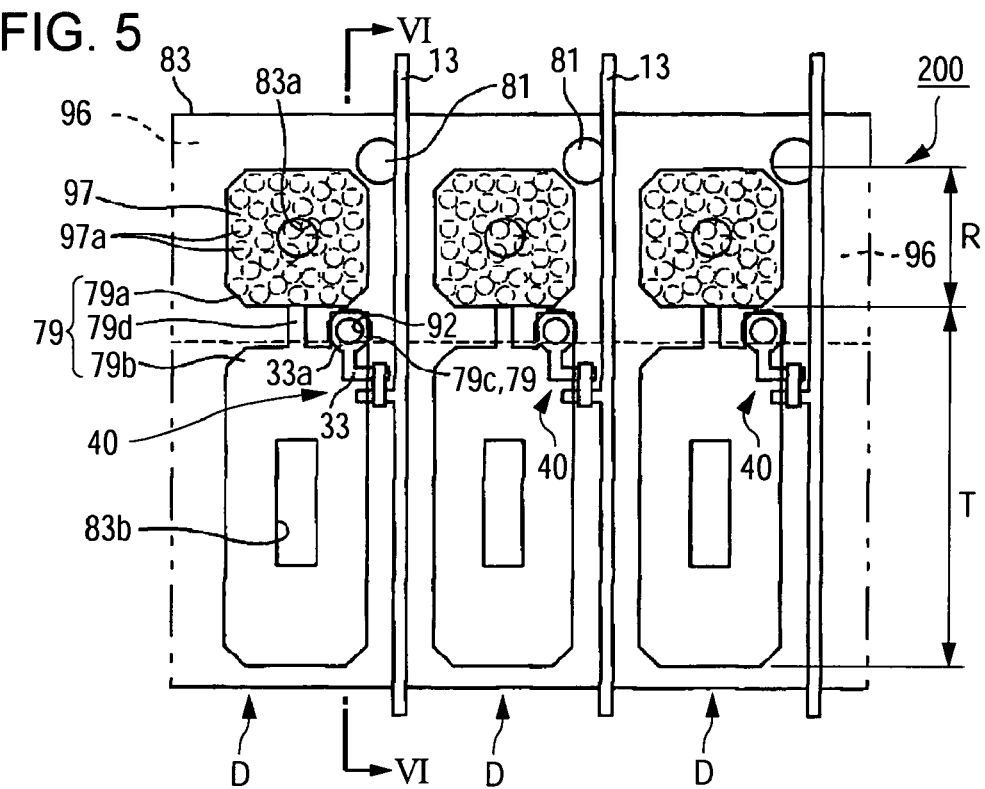
FIG. 5 is a plan view illustrating the structure of one pixel region of a liquid crystal display device according to a second embodiment of the invention.
Figure 6:
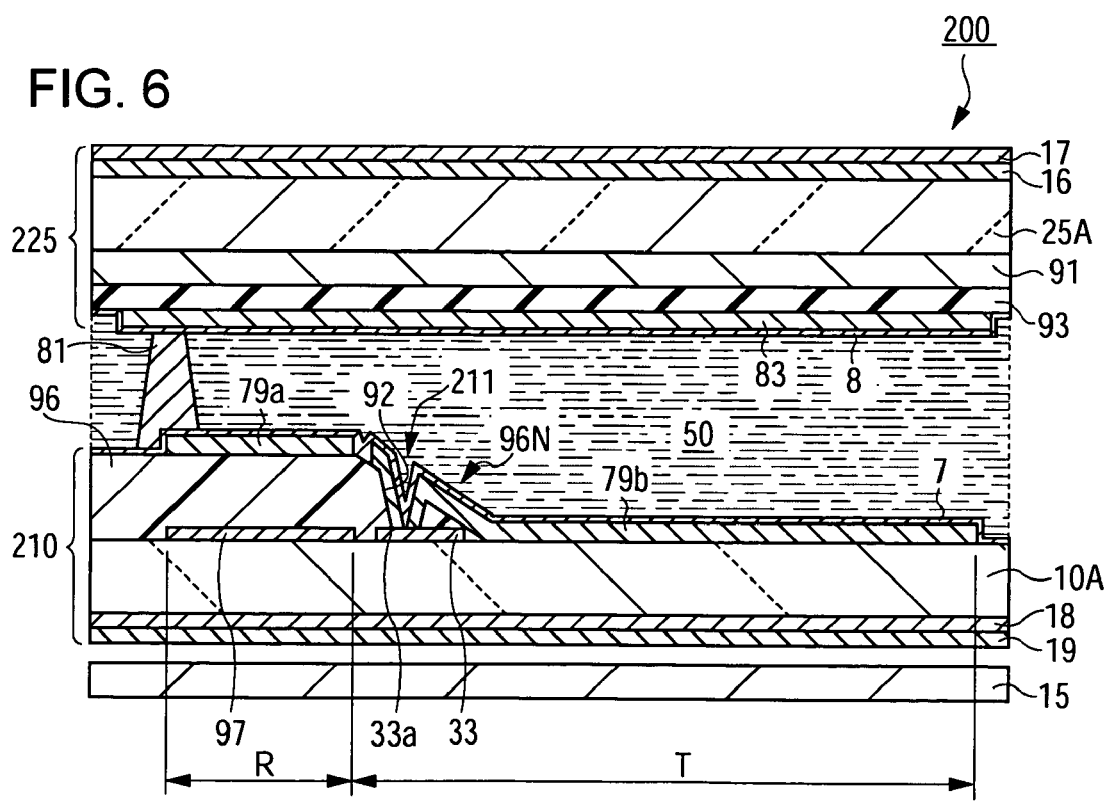
FIG. 6 is a cross-sectional view taken along the line VI-VI of FIG. 5.

A liquid crystal display device 200 of this embodiment includes an element substrate 210 and a counter substrate 225 opposite to the element substrate 210 with a liquid crystal layer 50 interposed therebetween, as shown in FIGS. 5 and 6. A pixel region shown in FIG. 5 includes three dot regions D that have substantially rectangular shapes in plan view and are arranged in the short-side direction thereof (in the horizontal direction of FIG. 5). In addition, a counter electrode 83 having a strip shape in plan view extends in the horizontal direction of FIG. 5 so as to be laid across the three dot regions D shown in FIG. 5.

In each dot region D, the scanning line 13 extends in the vertical direction of FIG. 5, and a pixel electrode (element electrode) 79 is provided along the extending direction of the scanning line 13 so as to be connected to the scanning line 13 through the TFD element 40. The pixel electrode 79 includes an island-shaped portion 79a having substantially a square shape in plan view, an island-shaped portion 79b having substantially a rectangular shape in plan view, and a connecting portion 79d for electrically connecting the island-shaped portions 79a and 79b. A projecting portion 79c protruding toward the island-shaped portion 79a is provided at a side of the island-shaped portion 79b facing the island-shaped portion 79a. A wiring line portion 33 having substantially an 'L' shape in plan view extends from the TFD element 40, and a leading end thereof is connected to a contact portion 33a having substantially an octagonal shape in plan view. In addition, the contact portion 33a is arranged so as to overlap the projecting portion 79c in plan view, and the projecting portion 79c is electrically connected to the contact portion 33a through a contact hole 92 formed in the same region, which results in electrical connection between the TFD element 40 and the pixel electrode 79.

A reflective layer 97 is provided substantially at the same position as the island-shaped portion 79a in plan view, and a plurality of uneven portions 97a, which are light scattering members, are formed in the surface of the reflective layer 97. Therefore, in the liquid crystal display device 200 of this embodiment, a plane region of the island-shaped portion 79a in which the reflective layer 97 is formed corresponds to a reflective display region R, and the other region in which the island-shaped portion 79b is formed as the main component corresponds to a transflective display region T.

An electrode slit (alignment control member) 83a having a circular shape in plan view is provided at the center of the island-shaped portion 79a, and an electrode slit (alignment control member) 83b having a rectangular shape in plan view is provided at the center of the island-shaped portion 79b. Both the electrode slits 83a and 83b are formed by cutting out portions of the counter electrode 83.

In the sectional structure shown in FIG. 6, the element substrate 210 has the reflective layer 97, the wiring line portions 33, the contact portions 33a, a liquid-crystal-layer-thickness adjusting layer 96, the pixel electrodes 79, and a vertical alignment film 7 formed on an inner surface of a substrate body 10A. That is, an element forming layer having the wiring line portions 33, the contact portions 33a, and the TFD elements 40 formed thereon is provided on the substrate body 10A, and the liquid-crystal-layer-thickness adjusting layer 96, which is an insulating film, is formed thereon. The liquid-crystal-layer-thickness adjusting layer 96 is partially provided in the dot region, similar to the liquid-crystal-layer-thickness adjusting layer 76 shown in FIGS. 3 and 4. On the liquid-crystal-layer-thickness adjusting layer 96, the island-shaped portion 79a of the pixel electrode 79 is formed at a position overlapping the reflective layer 97 in plan view, and most of the island-shaped portion 79b is formed in the region where the liquid-crystal-layer-thickness adjusting layer 96 is not formed on the substrate body 10A. A portion of the island-shaped portion 79b and the projecting portion 79c are formed on an inclined region 96N that is formed at an edge portion of the liquid-crystal-layer-thickness adjusting layer 96, and the projecting portion 79c is electrically connected to the contact portion 33a arranged at the lower side thereof through the contact hole 92 passing through the inclined region 96N.

Meanwhile, the counter substrate 225 is formed by laminating a colored portion (color filter) 91, a resin layer 93, the counter electrodes 83, and a vertical alignment film 8 on an inner surface of a substrate body 25A in this order.

Further, cylindrical spacers 81 are provided in the vicinities of the island-shaped portions 79a in the region where the liquid-crystal-layer-thickness adjusting layer 96 is formed to cause the gap between the substrates 210 and 225 to be maintained at a predetermined value in the region where the thickness of the liquid crystal layer is relatively small in the dot region.

As described above, the liquid crystal display device 200 has a multi-gap structure in which the thickness of the liquid crystal layer in the reflective display region R is smaller that that in the other regions (including the transmissive display region T), and an overlayer structure in which the liquid-crystal-layer-thickness adjusting layer 96 functions as an insulating film for separating the contact portion 33a from the pixel electrode 79.

Therefore, the liquid crystal display device 200 of this embodiment having the overlayer structure makes it possible to effectively shield a strong electric field due to the scanning lines 13 or the TFD elements 40, and to prevent the lowering of contrast due to alignment disorder of the liquid crystal molecules.

Furthermore, in the liquid crystal display device 200 of this embodiment, the contact hole 92 constituting an electrical connection portion between the pixel electrode 79 and the TFD element 40 is provided in a region between the two island-shaped portions 79a and 79b constituting the pixel electrode 79, and the contact hole 92 is formed in the inclined region 96N.

Since the thickness of the liquid crystal layer is continuously changed in the inclined region 96N, the thickness of the liquid crystal layer deviates from an optical design value in this region. However, when the contact hole 92 is provided in the region, it is possible to effectively use the dot region D such that the pixel electrode 79, the contact hole 92, and the TFD element 40 are arranged at high density, which results in an improvement in the aperture ratio of pixels and high-brightness display.

Further, in this embodiment, as shown in FIG. 6, a concave portion 211 is formed due to the contact hole 92, so that the thickness of the liquid crystal layer becomes large in this portion. In addition, the contact hole 92 is provided at an outer side of the reflective layer 97 to be included in the transmissive display region T, as shown in FIG. 6. As viewed from the transmissive display region T, conversely, the thickness of the liquid crystal layer is small in the concave portion 211. Therefore, transmission light is not colored, and transmittance is lowered, resulting in a little dark display. Thus, according to the liquid crystal display device of this embodiment, it is possible to achieve high-quality display without colored display light.

Furthermore, the island-shaped portion 79a is provided in the reflective display region R, and the island-shaped portion 79b is provided in the transmissive display region T. Therefore, substantially radial liquid crystal domains are formed in the reflective display region R and the transmissive display region T, respectively, when a voltage is applied. Thus, it is possible to obtain a liquid crystal display device capable of performing display with a wide viewing angle and high contrast.

Electronic Apparatus

Next, an electronic apparatus including the liquid crystal display device formed by a manufacturing method of the invention will be described.

Figure 7:
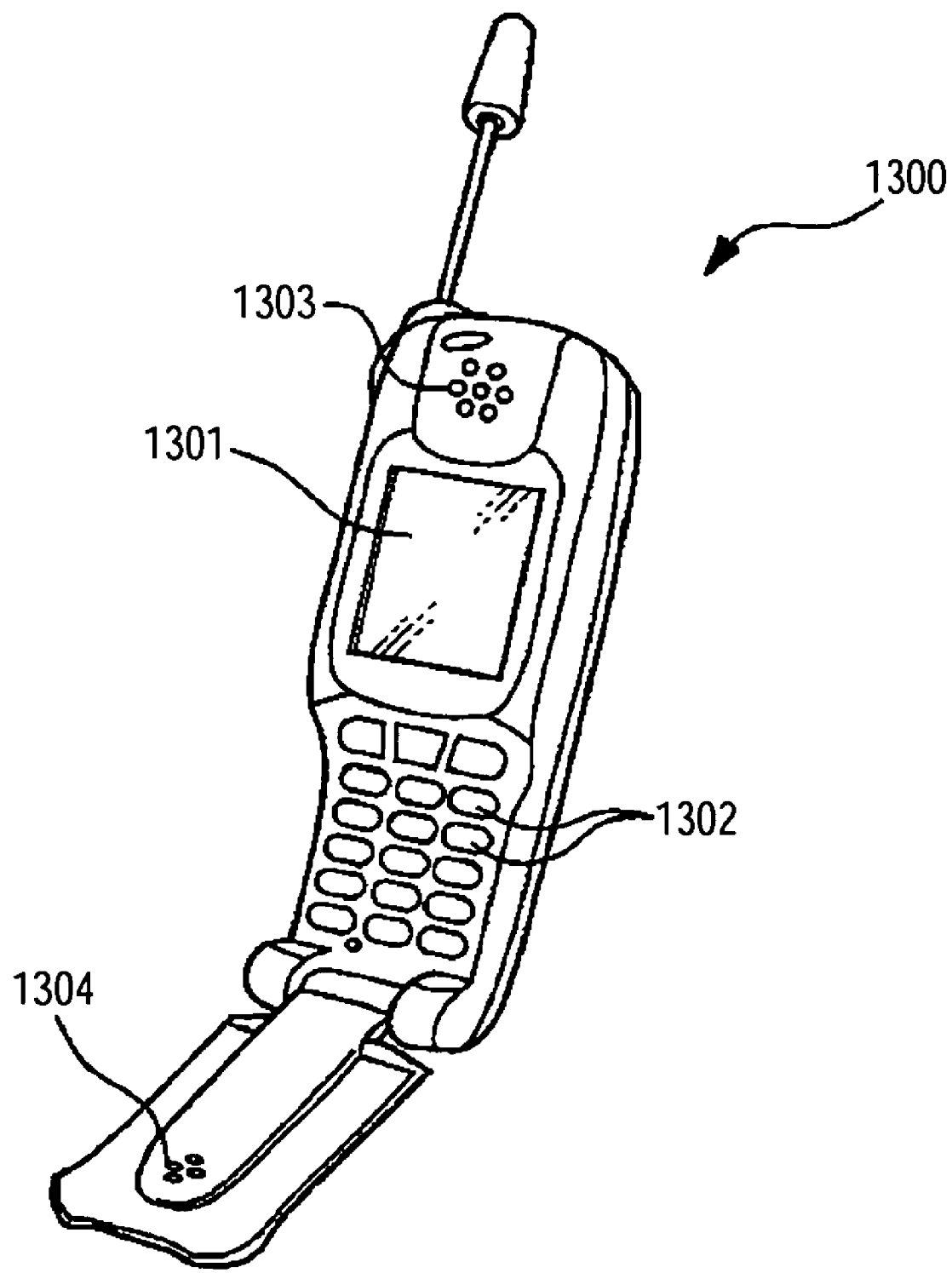
FIG. 7 is a perspective view illustrating an example of an electronic apparatus according to the invention.

FIG. 7 is a perspective view of an example of a cellular phone. In FIG. 7, reference numeral 1300 denotes a cellular phone, and reference numeral 1301 denotes a display unit using the liquid crystal display device. Reference numeral 1302 denotes an operating unit, and reference numerals 1303 and 1304 denote a receiver unit and a transmitter unit, respectively. The electronic apparatus includes the liquid crystal display device according to the above-described embodiment as a display unit, so it can perform high-quality display with high contrast and a wide viewing angle.

The liquid crystal display device according to the above-described embodiments can be applied as image display units to various electronic apparatuses, such as an electronic book, a personal computer, a digital still camera, a liquid crystal television, a view-finder-type or monitor-direct-view-type videotape recorder, a car navigation apparatus, a pager, an electronic organizer, an electronic calculator, a word processor, a workstation, a television phone, a POS terminal, and apparatuses including touch panels, in addition to the above-mentioned cellular phone. In this case, all the electronic apparatuses can perform high-quality display.

Although a description has been given above of the preferred embodiments of the invention with reference to the accompanying drawings, the invention is not limited thereto, but various changes and modifications can be made without departing from the scope or spirit of the invention. For example, in the above-described embodiments, the electrode slits having circular or rectangular shapes in plan view are provided as alignment control members. However, dielectric projections made of an insulating material, such as a resin material or an oxide, may be provided on the electrodes as the alignment control members. In addition, the shapes and dimensions of the electrode slits or dielectric projections are not limited to those in the above-descried embodiments, but they may be properly changed. Further, in the above-described embodiment, the invention is applied to an active matrix liquid crystal display device using TFDs as switching elements. However, the invention may be applied to an active matrix liquid crystal display device using TFTs as switching elements.

What is claimed is:

1. A liquid crystal display device comprising:
an element substrate;
a counter substrate opposite to the element substrate;

a liquid crystal layer interposed between the element substrate and the counter substrate, the liquid crystal layer being composed of liquid crystal having negative dielectric anisotropy;

a dot region having a transmissive display region and a reflective display region; and a liquid-crystal-layer-thickness adjusting layer provided between the liquid crystal layer and one of the element substrate and the counter substrate, the liquid-crystal-layer-thickness adjusting layer making thickness of the liquid crystal layer smaller in the reflective display region than in the transmissive display region of the dot region;

an element forming layer formed in between the element substrate and the liquid crystal layer, the element forming layer including a switching element; and an element electrode formed between an insulating film and the liquid crystal layer;

wherein the insulating film is formed between the element forming layer and the element electrode, the insulating film being formed with a contact hole that brings the element electrode into electrical connection with the element forming layer, the contact hole being located within the dot region at a position outside of the reflective display region of the dot region;

the element electrode includes two island-shaped portions two-dimensionally arranged in the dot region and a connection portion that electrically connects the island-shaped portions to each other, one of the island-shaped portions being disposed in the reflective display region and the other island-shaped portions being disposed in the transmissive display region, the connection portion being provided at between the reflective display region and the transmissive display region in plan view; and the island-shaped portion arranged in the transmissive display region is provided with a protecting portion that protrudes from one side thereof toward outside of the dot region, the contact hole being arranged so as to overlap the protecting portion in plan view.

2. The liquid crystal display device according to claim 1, further comprising a light-shielding member formed in the dot region, the contact hole being disposed at a position separated in plan view from the light-shielding member of the dot region.

3. The liquid crystal display device according to claim 1, wherein the element forming layer includes a wiring line portion extending from the switching element to the contact hole, the wiring line portion being electrically connected to the element electrode through the contact hole.

4. The liquid crystal display device according to claim 1, wherein the projecting portion protrudes from an outer edge of the element electrode toward outside of the dot region.

5. The liquid crystal display device according to claim 1, wherein the projecting portion of the island-shaped portion in the transmissive display region protrudes toward the island-shaped portion that is connected to the island-shaped portion through the connecting portion.

6. The liquid crystal display device according to claim 5, wherein the projecting portion protrudes from the island-shaped portion in the transmissive display region toward the island-shaped portion in the reflective display region at a position between the transmissive display region and the reflective display region in plan view.

7. An electronic apparatus comprising the liquid crystal display device according to claim 1.

8. A liquid crystal display device comprising:
an element substrate;
a counter substrate opposite to the element substrate;
a liquid crystal layer interposed between the element substrate and the counter substrate, the liquid crystal layer being composed of liquid crystal having negative dielectric anisotropy;
a dot region having a transmissive display region and a reflective display region; and
a liquid-crystal-layer-thickness adjusting layer provided between the liquid crystal layer and one of the element substrate and the counter substrate, the liquid-crystal-layer-thickness adjusting layer making thickness of the liquid crystal layer smaller in the reflective display region than in the transmissive display region of the dot region;
an element forming layer formed in between the element substrate and the liquid crystal layer, the element forming layer including a switching element; and
an element electrode formed between an insulating film and the liquid crystal layer,
wherein the insulating film is formed between the element forming layer and the element electrode, the insulating film being formed with a contact hole that brings the element electrode into electrical connection with the element forming layer, the contact hole being located within the dot region at a position outside of the reflective display region of the dot region, and
the liquid-crystal-layer-thickness adjusting layer in the dot region includes an inclined region, the contact hole in the dot region overlapping, in plan view, the inclined region in the dot region.

* * * * *